United States Patent [19]

Cormier

[11] Patent Number: 4,585,196
[45] Date of Patent: Apr. 29, 1986

[54] SUPPORT APPARATUS FOR TELEVISIONS FOR USE ON AUTOMOBILE CENTER ARM RESTS

[76] Inventor: John D. Cormier, 105 Edwis St., Lafayette, La. 70506

[21] Appl. No.: 583,606

[22] Filed: Feb. 27, 1984

[51] Int. Cl.$^4$ .............................................. E04G 5/06
[52] U.S. Cl. ................................... 248/214; 248/124
[58] Field of Search ............... 248/214, 207, 310, 124, 248/149, 155.2, 678, 205.1, 551; 297/112, 113, 114, 191, 194; 224/275, 42.42, 42.43, 42.45 R; 179/146; 381/86, 87

[56] References Cited

U.S. PATENT DOCUMENTS

| | | | |
|---|---|---|---|
| 2,442,736 | 6/1948 | Valentine | 248/124 |
| 2,501,580 | 3/1950 | Reid | 297/194 |
| 2,686,701 | 8/1954 | Manczur | 297/194 |
| 2,687,336 | 8/1954 | Smith et al. | 297/191 |
| 2,833,334 | 5/1958 | Hunt | 297/112 |
| 3,296,555 | 8/1966 | Henderson | 224/42.42 |
| 4,136,805 | 1/1979 | Storms | 248/310 |
| 4,311,099 | 1/1982 | Roberts | 297/194 |
| 4,383,626 | 5/1983 | Weinblatt | 224/275 |
| 4,454,732 | 6/1984 | Burkland et al. | 248/676 |

*Primary Examiner*—Ramon S. Britts
*Assistant Examiner*—Ramon O. Ramirez
*Attorney, Agent, or Firm*—George A. Bode

[57] ABSTRACT

A television support apparatus for use on an automobile front seat or center arm rest utilized for rear seat viewing. The frame is generally U-shaped to fit over the back rest of the front seat or center arm rest and is secured to the seat or center arm rest by straps which are tightened around the seat or arm rest. The portable television is secured to the frame by channel members which receive the base of the television and also by a strap which is tightened around the frame and television. The rearward facing portion of the frame is provided with speakers connected to the television.

5 Claims, 5 Drawing Figures

U.S. Patent  Apr. 29, 1986  Sheet 1 of 2  4,585,196
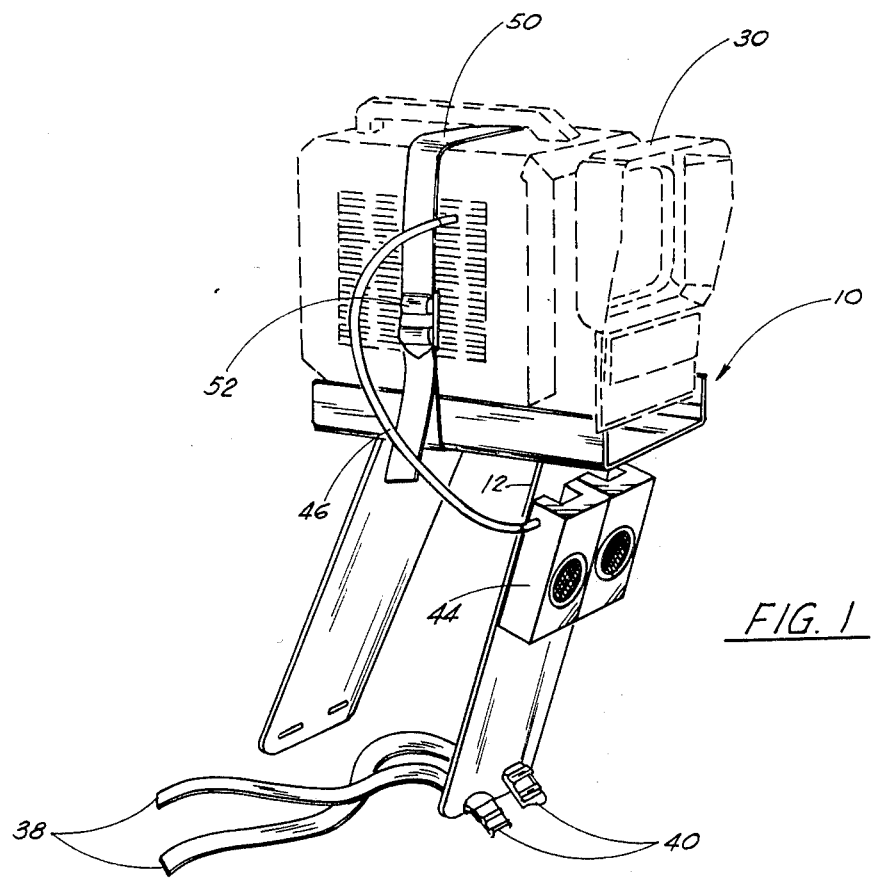
FIG. 1
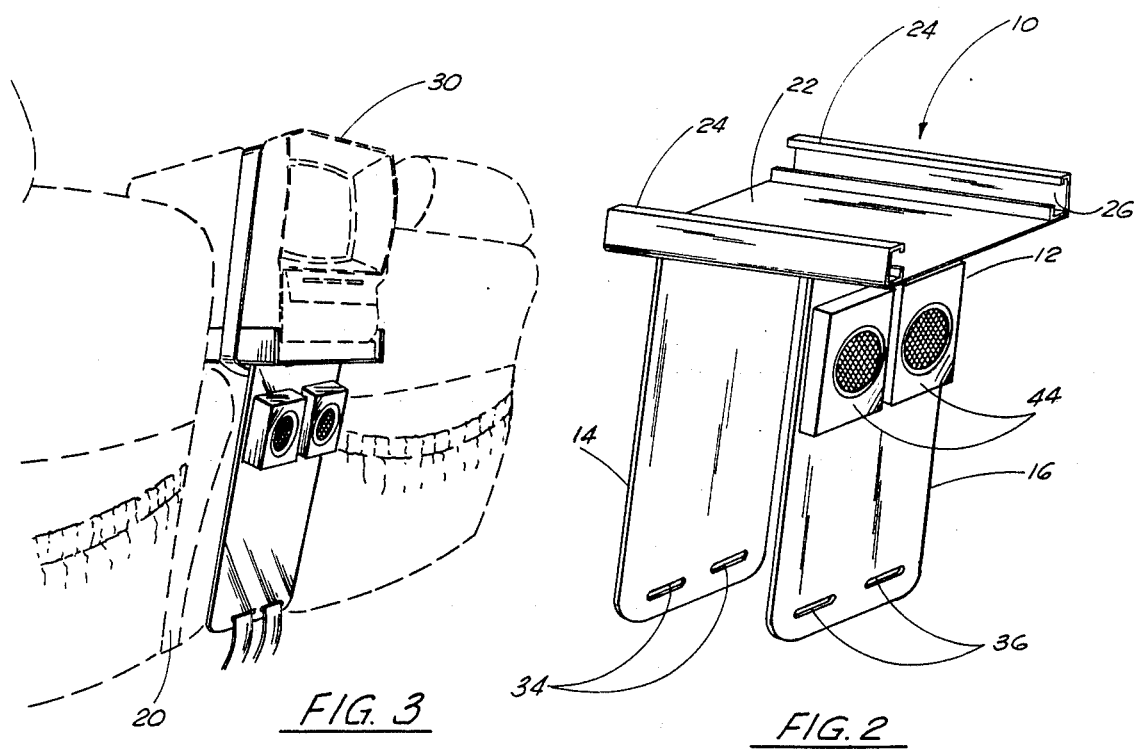
FIG. 3
FIG. 2

SUPPORT APPARATUS FOR TELEVISIONS FOR USE ON AUTOMOBILE CENTER ARM RESTS

BACKGROUND OF THE INVENTION

1. Field of the Invention

The present invention relates to television support apparatus for use on center arm rest of automobiles. More particularly, the apparatus of the present invention relates to television support apparatus with detachable speakers for use on the center arm rest of an automobile.

2. General Background

Television viewing for backseat passengers traveling in an automobile has been found to be useful to a broad range of people from busy executives who maintain a chauffeured driven limousine to children and adults on long family automobile trips. Therefore there is a need for a removable television support apparatus with speakers for use in an automobile.

Several attempts have been made in the prior art to develop an apparatus for supporting a television on the center arm rest in an automobile.

A typical prior art device would have a frame shaped to fit on the back of the front seat or center arm rest of the automobile with a platform which can be raised or lowered to a desired position on which the television may rest. Means are provided to secure television to the support and speakers are provided as part of the assembly. Such prior art devices are illustrated in the following U.S. Patents:

U.S. Pat. No. 4,383,626, issued to L. S. Weinblatt.

Other U.S. Patents which are directed to the field of art are the following:

U.S. Pat. No. 3,068,048, issued to E. F. Mahon, et al which discloses an arm rest designed and adapted for use in the interior of an automobile.

U.S. Pat. No. 3,103,630, issued to K. Pitts, et al and discloses a center arm rest with detachable radio adapted to fit on the center arm rest of an automobile which utilizes the automobile power supply, speaker system and the antenae.

U.S. Pat. No. 2,669,495, issued to W. L. Foote, which discloses a clamp-on table for the arm of the chairs or the like.

U.S. Pat. No. 2,633,180, issued to M. J. Reed, which discloses an arm rest attachment for use with seats of automobiles and other vehicles.

U.S. Pat. No. 3,282,230, issued to C. L. Levy, and discloses a portable surface which can be temporarily fixed to external members by U-bracket.

U.S. Pat. No. 3,893,729, issued to G. K. Sherman, et al, and discloses a hinged arm rest which can fold flat to an underside of a seat when not in use.

U.S. Pat. No. 2,693,400, issued to R. D. Erickson, which discloses an adjustable serving tray for automobile seats;

U.S. Pat. No. 2,666,701, issued to J. Manczur, which discloses a detachable arm chair table which is secured to an automobile seat by a U-shaped frame.

U.S. Pat. No. 4,311,099, issued to J. Roberts, discloses a seat mountable tray.

Many of these devices suffer in that the support apparatus is not an inherently stable position when mounted on the car seat or car seat arm rest.

SUMMARY OF THE INVENTION

It is an object of the present invention to provide a removable television support apparatus for use on the center arm rest of automobiles.

It is a further object of the present invention to provide a removable television support apparatus with speakers for use on an automobile center arm rest.

It is a further object of the present invention to provide a television support apparatus for use on an automobile seat or center arm rest which is inherently stable to minimize vibration of the television set during viewing as the automobile is in motion.

The apparatus of the present invention provides a frame shaped to fit on the rear portion of the front seat of the an automobile or on its center arm rest in either the vertical or horizontal position. Attached to the frame is a platform which is substantially perpendicular to the legs of the frame and which can be raised to the desired position on which the television may rest. Rearward facing speakers are provided on the rear leg of the frame and fastening means are provided to secure the frame to the car seat portion or arm rest.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 1 is a perspective view of the apparatus of the present invention with a television (in phantom view) mounted thereon.

FIG. 2 is a perspective view of the apparatus of the present invention without straps.

FIG. 3 is a view of the apparatus of FIG. 1 installed on an automobile arm rest for rear seat viewing.

DETAILED DESCRIPTION OF THE PREFERRED EMBODIMENT

Figure 4:
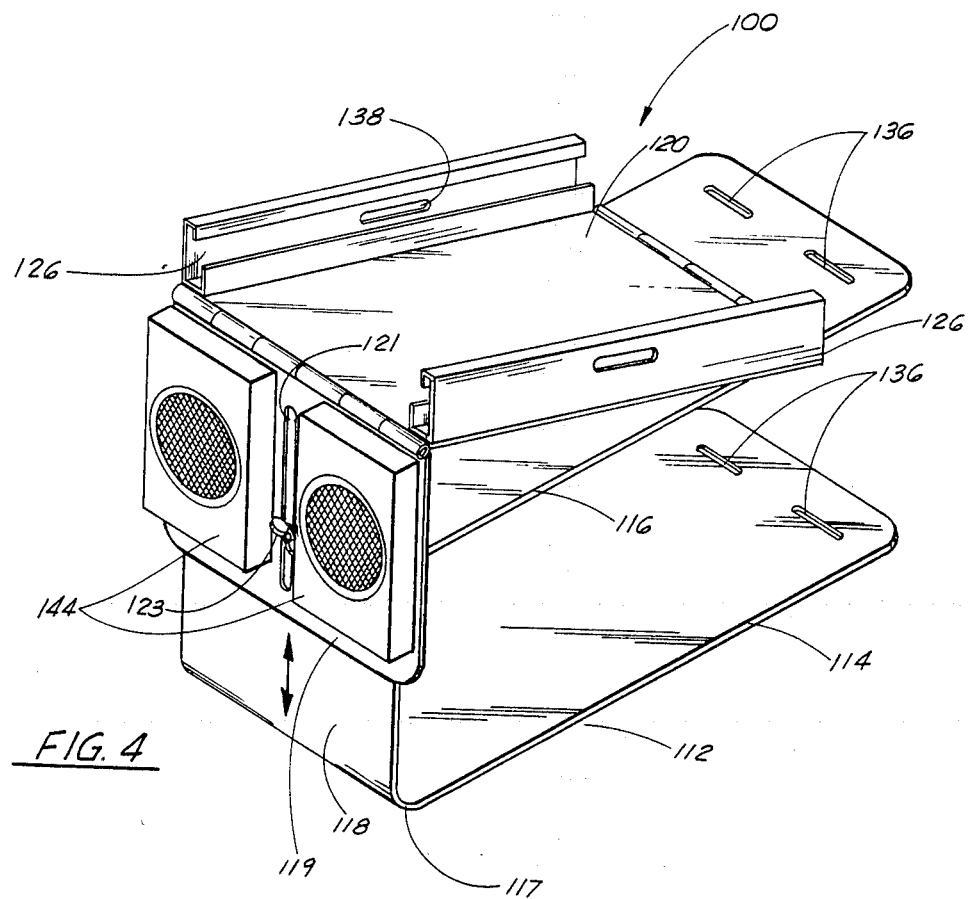
FIG. 4 is an alternate embodiment of the apparatus of the present invention in perspective view.

FIGS. 1 and 2 best show the preferred embodiment of the apparatus of the present invention designated generally by the numeral 10. Television support apparatus 10 is comprised of a generally U-shaped frame portion 12 which is further comprised of front and rear leg portions 14, 16 respectively which are integrally connected at their uppermost end to platform 18. Thus frame 12 is constructed to fit snugly on the top of the back rest portion of a full length automobile seat (not shown) or on a standard automobile center arm rest piece 20 in its upright position, best illustrated in FIG. 3. Platform 18 is further provided with surface portion 22 and sidewalls 24 which provide for elongated channels 26 adapted to receive the base of portable television 30 (shown in phantom view in FIGS. 1 and 3) to stably fix the same therein. As best seen in FIGS. 1 and 2, leg portions 14 and 16 of frame 12 are substantially perpendicular to surface 22 of platform 18 in the support position of FIG. 3 to stabilize the mounting of television 30 on apparatus 10. This construction is decidedly superior over that shown in U.S. Pat. No. 4,383,626 of Weinblatt in which the upper platform 15 is supported merely by arms 39 and 41 at hinge 43.

Returning to the apparatus of FIGS. 1 through 3, the preferred location for apparatus 10 on a car seat without a center arm rest is in the middle thereof and in a car seat of the type of FIG. 3 on the center arm rest 20. To securely affix apparatus 10 to center of a unitary front car seat or arm rest 20 of a split seat, fastening means are provided which are comprised of slots 34, 36 provided in the front and rear leg portions 14, 16 respectively of frame 12 and staps 38 are passed through sots 34, 36, and tightened through conventional buckles 40 provided at either end of staps 38. With front and rear leg sections 14, 16 of frame 12 anchored in this way, the support is snuggly fit against the automobile seat or center arm rest 20 as the case may be and will not be dislodged during sudden stops or accelerations, or during sharp turns.

Further provided on apparatus 10 are speakers 44 which in the preferred embodiment are affixedly secured to rear leg portions of frame 12 so that they are facing the viewers who will be seated in the rear seat of the automobile. Speakers 44 are mounted to frame leg 16 in any conventional method such as by bolting thereto. Speakers 44 are readily connected and disconnected to television 30 by conventional wiring 46 and jacks (not shown).

In addition to the unique construction of television support platform 18 which provides for channel means 26 there is provided support strap 50 for securing television 30 to platform 18.

In operation, support apparatus 10 is secured and placed on the automobile seat or center arm rest with the aid of frame 12 and straps 38. Platform 18 is secured in its desired horizontal position by tensioning straps 38 underneath the center arm rest or the seat if there is no center arm rest. Television set 30 operable on d.c. power is placed on platform 18 facing rearward with its base slid into channels 26 of support surface 18. It should be noted that support surface 18 can be a variety of sizes to accommodate the many different makes of television sets. Strap 50 is then provided to secure television 30 to support 18 with the suitable adjustment of strap 50 and buckle 52. The power cords of the television are then plugged into the conventional adapter and plug (not shown) which is plugged into the cigarette lighter receptacle. The television can be placed into operation and speakers 44 can be activated.

Figure 5:
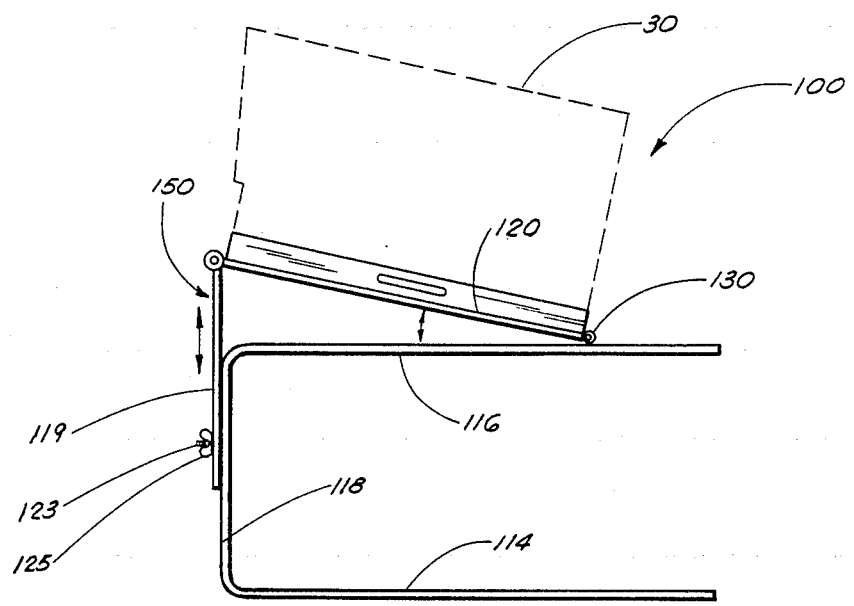
FIG. 5 is a side view of the apparatus of FIG. 4 with a television (in phantom view) mounted thereon and without speakers installed.

An alternate embodiment of the apparatus of the present invention is generally designated by the number 100 is provided in FIGS. 4 and 5. Embodiment 100 would be suitable to the operator who prefers to place the television set 30 at a lower level in the automobile. This can be accomplished by rotating car seat center assembly 20 to its horizontal most position and snuggly fitting frame 112 onto arm rest portion 20 so that leg portion 114 is lowermost portion and leg portion 116 is the uppermost portion and becomes horizontal support surface for television 30. Portions 114 and 116 are joined to vertical section 118 in such a manner that 118 and 114 are a unitary piece provided at a 90° angle through curve portion 117 with upper leg portion 116 also provided at a 90° angle with vertical section 118 to form a unitary piece between 118 and 116, as can be seen in FIG. 5. To stably support television 30, upper portion 116 is provided with channel means 126 similar to channel means 26 of the preferred embodiment. Slots 136 are provided in portions 114, 116 of apparatus 100 for securing the same to car seat center portion 20. Slots 138 are provided in channel means 126 to provide a means of securing the television to apparatus 100 through the use of a strap and buckle similar to that in FIG. 1. Speakers 144 may be mounted to vertical plate 119 to provide audio to the passenger viewer. The alternate embodiment further provides a means 150 for adjusting the attitude of television when mounted on support 120. The level control 150 further provides for lip portion 119 provided with a centrally disposed vertically elongated slot 121 adapted to receive a bolt 123 that when plate 119 is raised, it can be secured at any level by tightening of fastening means 125. In this way, support platform 120 can assume the angle A of FIG. 5 and satisfy the preferred viewing of passengers in rear seat. To lower television support 120 and thus television 30 to the horizontal position, fastening means 125 would be loosened and vertical plate 119 would be lowered so that surface 120 would engage horizontal leg portion 116 and thus television 30 would assume the horizontal position.

Because many varying and different embodiments may be made within the scope of the inventive concept herein taught, and because many modifications may be made in the embodiment herein detailed in accordance with the descriptive requirement of the law, it is to be understood that the details herein are to be interpreted as illustrative and not in a limiting sense.

What is claimed as invention is:

1. A television support apparatus for use on an automobile front seat or center arm rest utilized for rear seat viewing comprising:
    a. a frame shaped to fit over said center arm rest when in its horizontal most position and having an upper horizontal portion, a lower horizontal portion and a vertical portion;
    b. said vertical portion integrally affixed at opposite ends to the rearward ends of said upper and lower horizontal portions of said frame;
    c. means at the forward ends of said upper and lower horizontal portions of said frame for securing said frame to said center arm rest;
    d. a platform whereon a portable television may be placed and which is hingedly attached to said upper horizontal portion;
    e. means to secure a portable television to said platform; and
    f. means slidably attached to the vertical portion of said frame adapted to set the horizontal position of said platform.

2. The apparatus of claim 1, wherein said means for securing said frame to said center arm rest comprises a strap and buckle threaded through slots in said upper and lower horizontal portions of said frame.

3. The apparatus of claim 1, wherein said means to set the horizontal position of said platform comprises:
    a. a bolt rigidly affixed to said vertical portion of said frame which extends rearwardly of said vertical portion;
    b. a vertical lip hingedly attached to said platform and having a vertically disposed elongated slot to slidably receive said bolt; and
    c. a nut threadably engageable on said bolt to secure said vertical lip and platform at a selected height and horizontal position, respectively.

4. The apparatus of claim 3, further comprising speakers mounted to said vertical lip portion.

5. The apparatus of claim 1, wherein said means to secure a portable television to said platform comprises channel members rigidly affixed to said platform which are adapted to receive the base of said television and has slots through which a strap to be wrapped around said television may be threaded.

* * * * *